United States Patent
Gold-Gavriely et al.

(10) Patent No.: US 7,990,845 B2
(45) Date of Patent: *Aug. 2, 2011

(54) SYSTEM AND METHOD FOR FFT WINDOW TIMING SYNCHRONIZATION FOR AN ORTHOGONAL FREQUENCY-DIVISION MULTIPLEXED DATA STREAM

(75) Inventors: Itamar Gold-Gavriely, Sunnyvale, CA (US); Noam Galperin, Ma'a lot, IL (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/699,533

(22) Filed: Feb. 3, 2010

(65) Prior Publication Data

US 2010/0142659 A1   Jun. 10, 2010

Related U.S. Application Data

(63) Continuation of application No. 11/731,791, filed on Mar. 30, 2007, now Pat. No. 7,684,313.

(51) Int. Cl.
   *H04J 11/00* (2006.01)
(52) U.S. Cl. ........................................ 370/210
(58) Field of Classification Search ............... 370/203, 370/210, 259, 260, 263, 266, 267, 268, 269, 370/310, 315, 316, 319, 321, 324, 469, 480, 370/481; 375/316–352; 379/406.1–406.16
See application file for complete search history.

(56) References Cited

U.S. PATENT DOCUMENTS

| | | | |
|---|---|---|---|
| 5,166,924 A | 11/1992 | Moose | |
| 6,300,895 B1 | 10/2001 | Carrara et al. | |
| 6,330,293 B1 | 12/2001 | Klank et al. | |
| 6,459,744 B1 * | 10/2002 | Helard et al. | 375/354 |
| 6,470,030 B1 | 10/2002 | Park et al. | |
| 6,687,315 B2 | 2/2004 | Keevill et al. | |
| 7,020,116 B1 | 3/2006 | Nakada | |
| 2002/0034264 A1 | 3/2002 | Vigil | |
| 2002/0126220 A1 * | 9/2002 | Wilson et al. | 348/518 |
| 2004/0184399 A1 | 9/2004 | Chiou | |
| 2004/0228272 A1 * | 11/2004 | Hasegawa et al. | 370/210 |

(Continued)

OTHER PUBLICATIONS

Huang et al., "Joint Synchronization in Eureka 147 DAB System Based on Abrupt Phase Change Detection," IEEE Journal on Selected Areas in Communications, vol. 17, No. 10, pp. 1770-1780, Oct. 1999.

(Continued)

*Primary Examiner* — Kwang B Yao
*Assistant Examiner* — Obaidul Huq
(74) *Attorney, Agent, or Firm* — Lando & Anastasi, LLP

(57) ABSTRACT

A system and method for determining an FFT window location for reception of an OFDM signal received over a transmission channel. The OFDM signal includes a plurality of symbols each having a guard interval. The system includes a correlation module that determines a location of maximum correlation in a first symbol, an FFT module to perform an FFT on the OFDM signal based upon an initial FFT window location, and an adjustment module. The adjustment module determines a plurality of permissible echo location options based upon the initial FFT window location, selects a permissible echo location option that corresponds most closely to the location of maximum correlation, and adjusts the initial FFT window location based upon the selected permissible echo location option so that the adjusted FFT window location includes substantially all of a useful symbol length of the first symbol while a maximum number of echoes are included within the guard interval of the first symbol.

7 Claims, 8 Drawing Sheets

U.S. PATENT DOCUMENTS

| | | |
|---|---|---|
| 2004/0240379 A1 | 12/2004 | Tsuie |
| 2005/0141625 A1 | 6/2005 | Zhang |
| 2005/0180533 A1 | 8/2005 | Hamman |
| 2006/0140109 A1 | 6/2006 | Lin |
| 2006/0146947 A1 | 7/2006 | Kim |
| 2006/0165197 A1* | 7/2006 | Morita et al. ................. 375/326 |
| 2007/0064586 A1 | 3/2007 | Ma et al. |
| 2008/0198942 A1 | 8/2008 | Akella et al. |

OTHER PUBLICATIONS

Brugger et al., "OFDM Receivers-Impact on Coverage of Inter-Symbol Interference and FFT Window Positioning," EBU Technical Review, Jul. 2003.

Speth et al., "Optimum Receiver Design for OFDM-Based Broadband Transmission—Part II: A Case Study," IEEE Transactions on Communications, vol. 49, No. 4, Apr. 2001.

* cited by examiner

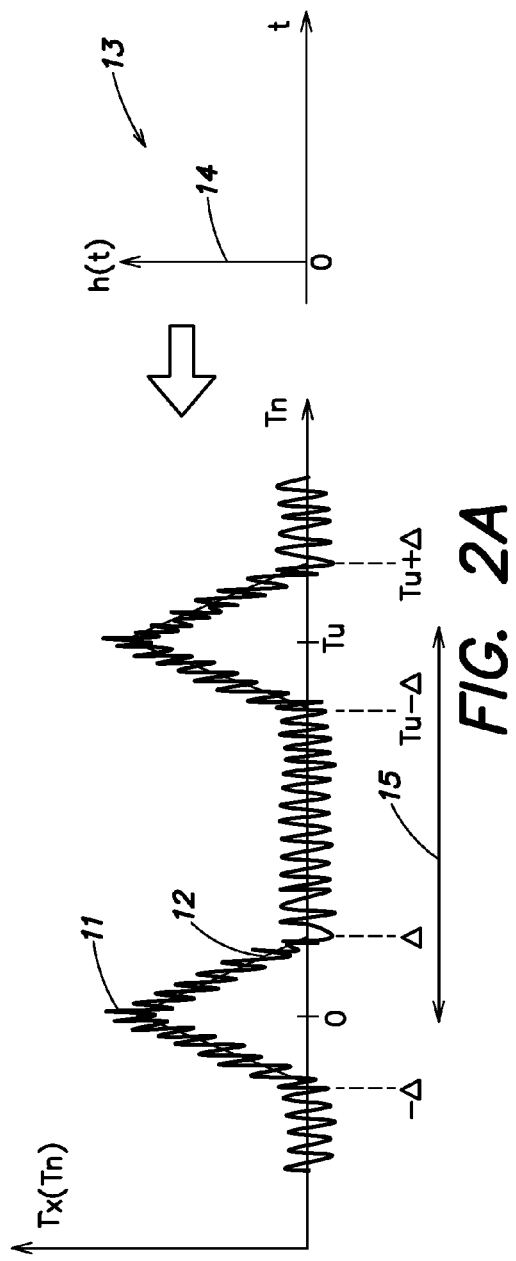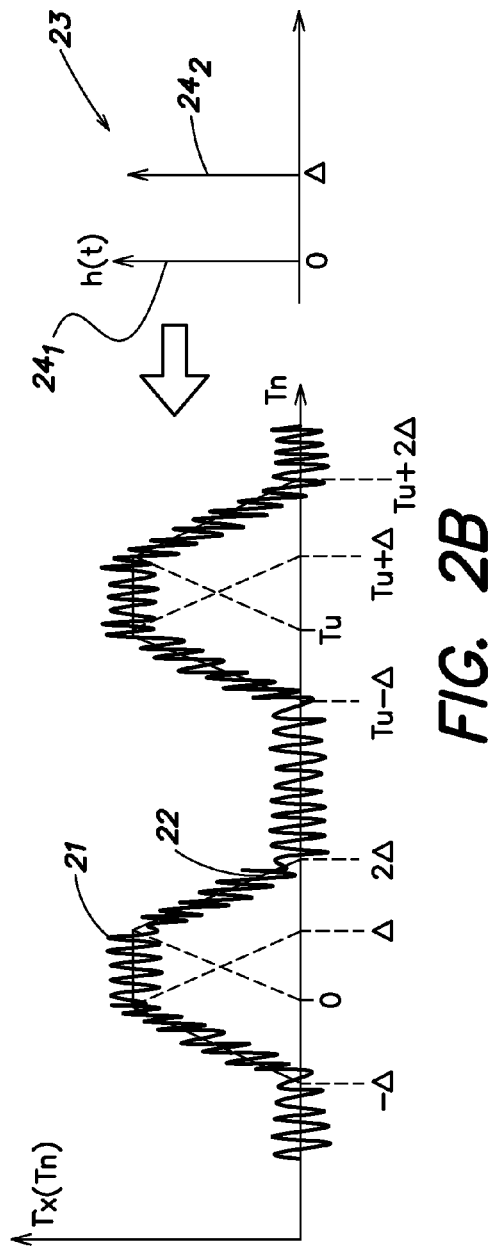

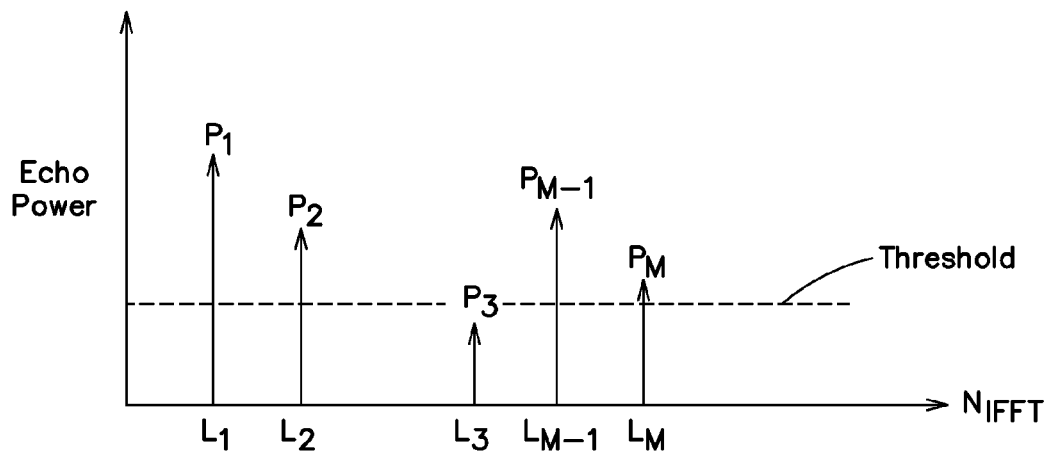
FIG. 5
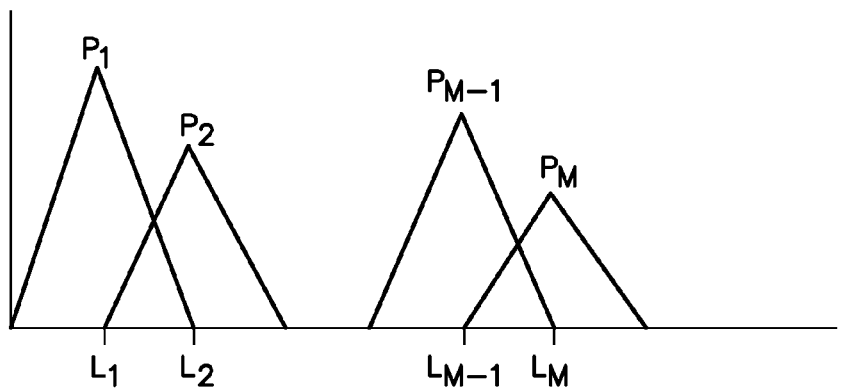
FIG. 6
FIG. 7

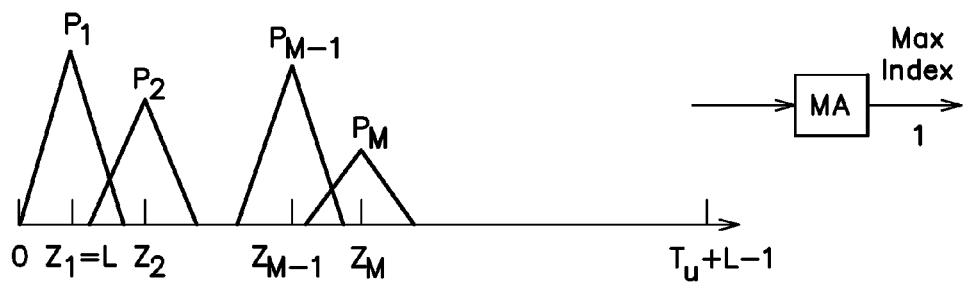
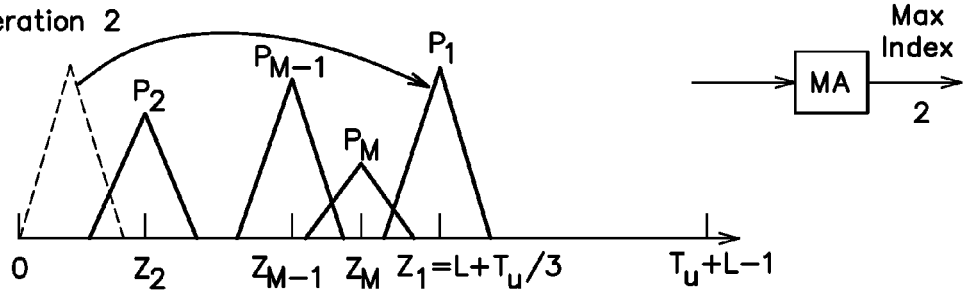
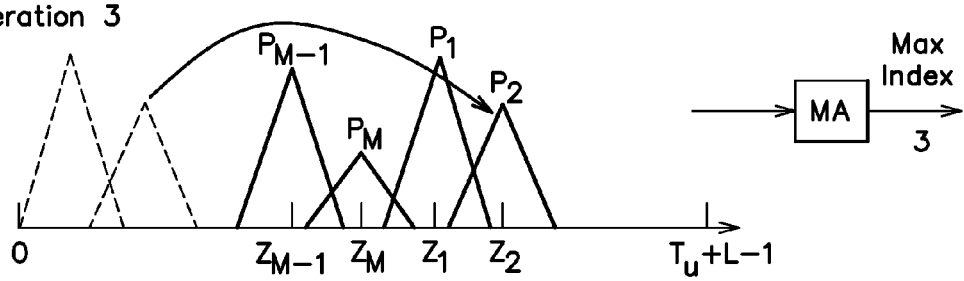
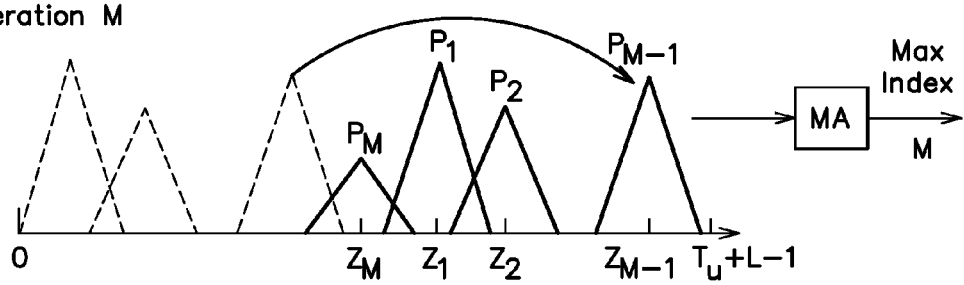
FIG. 8

SYSTEM AND METHOD FOR FFT WINDOW TIMING SYNCHRONIZATION FOR AN ORTHOGONAL FREQUENCY-DIVISION MULTIPLEXED DATA STREAM

BACKGROUND

1. Field of Invention

Aspects of the present invention are directed to the processing of an Orthogonal Frequency-Division Multiplexed signal, and more particularly to a system and method of synchronizing an FFT window on an Orthogonal Frequency-Division Multiplexed signal so that the FFT window includes substantially all of the useful data portion of a symbol and any appreciable echo energy lies within the guard interval of the symbol.

2. Discussion of Related Art

In Orthogonal Frequency-Division Multiplexing (OFDM) systems, information such as compressed audio and/or video data is carried via a large number of individual carriers (i.e., sub-carriers) in a frequency multiplex. The frequencies of the sub-carriers are selected so that the modulated data streams are orthogonal to each other, thereby eliminating cross-talk issues. Although each carrier transports only a relatively small amount of information, high data rates may be achieved by using a large number of carriers (e.g., 2048, 4096, 8192, respectively termed 2 k, 4 k, and 8 k mode) multiplexed together. The individual carriers are modulated (e.g., using phase-shift keying (PSK) techniques, or amplitude modulation techniques, such as Quadrature Amplitude Modulation (QAM)), with each carrier having a fixed phase and amplitude for a certain time duration, during which a small portion of the information is carried. That small portion of information is called a symbol, and the time period for which it lasts is called the symbol duration. The modulation is then changed and the next symbol carries the next portion of information. Examples of known OFDM systems include DVB-T (Digital Video Broadcasting-Terrestrial) Standard systems, T-DAB (Terrestrial Digital Audio Broadcasting) Standard systems, 3G and 4G mobile phone wireless network systems, as well as others.

In OFDM systems, modulation and demodulation are performed using the Inverse Fast Fourier Transformation (IFFT) and the Fast Fourier Transformation (FFT), respectively. The time duration of a symbol is the inverse of the carrier frequency spacing, thereby ensuring orthogonality between the carriers. In addition to the data that is carried by an OFDM signal, additional signals, termed 'pilot signals' (whose value and position are defined in the applicable standard, and are thus known by the receiver) are inserted into each block of data for measurement of channel conditions and also for synchronization.

In order to overcome inter-symbol interference, a portion of each symbol (e.g., the first portion or the last portion) is copied and appended to the beginning or end of the symbol. For example, in DVB-T standard systems, the last portion of the symbol is copied and appended to the beginning of the symbol as a cyclic prefix. In OFDM systems, and as used herein, that copied portion of the symbol is termed the "guard interval" and its duration (or length) is typically denoted $\Delta$, the duration of the original symbol (i.e., the "useful symbol duration") is typically denoted $T_U$, and the increased symbol duration is typically denoted $T_S$, where $T_S = T_U + \Delta$. Provided that most (or ideally all) echo energy from a prior symbol falls within the guard interval, the symbol may still be recovered.

In an OFDM receiver, the received OFDM signal is demodulated to baseband using some type of quadrature amplitude demodulation or phase shift keying demodulation, the resultant baseband signals are then typically low-pass filtered, and the filtered baseband signals are then sampled and digitized using analog to digital converters (ADCs). After removal of the guard interval, the digitized signals are then provided to an FFT module and converted back to the frequency domain. Because of the presence of the guard interval, a nearly infinite number of options exist as to where to place the FFT window to evaluate the symbol. In general, it is desired to place the FFT window on the useful part of the symbol ($T_U$), and so that all or nearly all echo energy lies within the guard interval ($\Delta$) of the symbol. One known process for determining where to locate the FFT window is described in U.S. Pat. No. 6,459,744 B1 (hereinafter the '744 patent), which is incorporated by reference herein, and is now functionally described with respect to FIGS. 1, 2A, and 2B herein, and which correspond to FIGS. 7, 1, and 2 of the '744 patent, respectively.

As described in the '744 patent, a received time domain OFDM signal x(t) is sampled at a sampling frequency $H_S$ and converted into the frequency space by means of an N-point FFT 72. The sampled signal is also provided to a means 76 for measuring a correlation of the guard interval of the sampled signal. The means for measuring the correlation of the guard interval 76 includes a correlator and summing accumulator 761, that is provided with the sampled signal x(t) and with the same sampled signal x(t) delayed by the useful symbol length $T_U$.

As described in the '744 patent, under ideal conditions where there is no noise, no multiple paths (i.e., no meaningful echo energy), and no co-channel interference, the correlation of the guard interval preceding the useful part of a symbol and the end of the useful part of the symbol may not only be used for a "rough" temporal synchronization, but may also be used for a fine temporal synchronization of the FFT window placement. This is illustrated in FIG. 1 of the '744 patent reproduced here as FIG. 2A.

FIG. 2A illustrates a measurement of the correlation $\Gamma x(Tn)$, and the pulse response h(t) 13, for both a noise-affected idealized signal 11 and for a noiseless idealized signal 12 that are received over a transmission channel with only one path 14 (i.e., having no meaningful echo energy). As can be seen in FIG. 2A, where there is no meaningful echo energy present, the correlation of the guard interval and the end of the useful part of the symbol will resemble a triangle with a defined peak in the region of maximum correlation.

However, as also described in the '744 patent, where there is significant echo energy present in the received signal, or where there is a high level of interference, the correlation of the guard interval and the end of the useful part of the symbol will be less well defined, and will resemble more of a deformed trapezoid, with each echo being reflected by a correlation peak. For example, FIG. 2B illustrates a measurement of the correlation $\Gamma x(Tn)$, and the pulse response h(t) 23, for both a noise-affected signal 21 and for a noiseless signal 22 that are received over a transmission channel having two paths $24_1$, $24_2$ spaced apart by a length of the guard interval $\Delta$ and received with identical power (i.e., a main signal having an echo with the same power as the original signal, and having a delay equal in length to the guard interval). As can be seen in FIG. 2B, the main signal and the echo are each reflected as a correlation peak, and although the correlation of the guard interval and the end of the useful part of the symbol may still be used to determine a length of the OFDM symbol, its precision makes it difficult to discern where to optimally place the FFT window.

To overcome this deficiency, the '744 patent describes the use of a means 77 for computing an estimation of the pulse response of the channel. As described in the '744 patent, after the received signal x(t) is sampled and converted into the frequency space by means of the N-point FFT 72, those samples corresponding to one or more reference carriers (i.e., pilot signals) are extracted and grouped to construct a fictitious synchronization symbol in module 771. The fictitious synchronization symbol is standardized by multiplication 772 and then subjected to an inverse FFT 775 on N/R points (where N represents the number of orthogonal sub-carriers and R represents the spacing of a reference sub-carrier every R sub-carriers) to provide an estimation of the pulse response ($\hat{h}_n$) of the channel.

The '744 patent describes that an analysis of the estimation of the pulse response of the channel may be used to determine the useful part of each symbol in the frame of the received OFDM signal, and to identify the location of the main signal and any significant echoes. However, the '744 patent notes that under certain circumstances, an analysis of the estimation of the pulse response of the channel is incapable of distinguishing between a long echo (e.g., an echo having a delay greater than $T_U/4$ and less than $T_U/3$ of the current FFT window position) and a pre-echo. To remove this ambiguity, the '744 proposes the use of the correlation of the guard interval to remove the ambiguity inherent in the estimation of the pulse response of the channel.

As shown in FIG. 1, and as described with respect to FIGS. 6A and 6B of the '744 patent, the '744 patent provides a signal processing means 75 that analyzes the spread of the correlation result provided by the means for measuring the guard interval correlation 76, and uses that information to distinguish between a pre-echo and a long echo in the estimation of the pulse response of the channel. As described in the '744 patent, provided that the receiver was previously well synchronized on the main path of the signal, the measurement of the correlation of the guard interval and the end of the useful part of the symbol is spread to a much greater extent in the case where the echo is a long echo than in the case of a pre-echo. Thus, by counting the number of samples that go beyond a given decision threshold, or by calculating the ratio of the number of samples greater than this threshold relative to the number of samples below the threshold, it is possible to distinguish between a pre-echo and long echo. Upon making a determination as to whether the echo is a long echo or a pre-echo, the signal processing means 75 uses that determination to adjust (i.e., delay or advance) the timing of the FFT window.

As noted above, the '744 patent discloses how an analysis of the estimation of the pulse response of the transmission channel may be used in conjunction with an analysis of the spread of the correlation of the guard interval and the end of the useful part of a symbol to adjust the location of the FFT window. However, the methodology used in the '744 patent presumes that the FFT window was previously well synchronized on the main path of the signal. In contrast, embodiments of the present invention are directed to systems and method for optimally locating an FFT window, irrespective of whether the FFT window was previously well synchronized.

SUMMARY OF INVENTION

Embodiments of the present invention are directed to a system and method of determining an FFT window placement for the extraction of data from an OFDM signal, so that the FFT window includes substantially all of the useful data portion of a symbol while all, or substantially all, appreciable echo energy lies within the guard interval of the symbol. Advantageously, embodiments of the present invention may be used to achieve a fast lock and high quality reception when a ratio of a length of the guard interval relative to the useful symbol length is greater than one half an effective pilot sub-carrier to total sub-carrier ratio of the OFDM signal, and irrespective of whether the FFT window was previously well synchronized. As used herein, the effective pilot sub-carrier to total sub-carrier ratio refers to the effective rate at which pilot signals are received in the OFDM signal.

In accordance with one aspect of the present invention, a method of determining an FFT window location for reception of an OFDM signal received over a transmission channel is provided. The OFDM signal includes a plurality of symbols each having a guard interval, and the method comprises acts of a) determining, according to a first process, a location of maximum correlation in a first symbol of the plurality of symbols; b) determining an initial location of the FFT window; c) determining a plurality of permissible echo location options based upon the initial location of the FFT window and a second process, different than the first process; d) selecting a permissible echo location option from the plurality of permissible echo location options that corresponds most closely to the location of maximum correlation; and e) adjusting the initial location of the FFT window so that the adjusted FFT window location includes substantially all of a useful symbol length of the first symbol while a maximum number of echoes are included within the guard interval of the first symbol.

In one embodiment, the act (a) may include an act of determining, according to the first process, the location of maximum correlation in the first symbol based upon a correlation between a first plurality of samples of the first symbol and a corresponding second plurality of samples of the first symbol that are spaced apart from the first plurality of samples of the first symbol by the useful symbol length of the first symbol.

In another embodiment, the act (d) may include an act of comparing each of the plurality of permissible echo location options determined in act (c) to the location of maximum correlation determined in act (a) to select the permissible echo location option from the plurality of permissible echo location options that corresponds most closely to the location of maximum correlation. In accordance with this embodiment, and where the OFDM signal includes pilot signals, the act (c) may include acts of extracting a plurality of pilot signals based upon the initial location of the FFT window; generating a channel estimate based upon the plurality of extracted pilot signals; and performing an Inverse FFT on the channel estimate to generate a data structure identifying a location and amplitude of each echo in the channel estimate. According to a further aspect of this embodiment, the act (c) may further include acts of determining an initial echo location option based upon the location and amplitude of each echo in the channel estimate, and determining the plurality of permissible echo location options based upon alternative permissible locations for each echo in the initial echo location option.

Advantageously, embodiments of the present invention may be used to determine the FFT window location for OFDM signals in which a ratio of a length of the guard interval relative to a useful symbol length of each of the plurality of symbols is greater than one half an effective pilot sub-carrier to total sub-carrier ratio of the OFDM signal, and in addition, where prior to the act of determining the initial location of the FFT window, the initial location of the FFT window was not synchronized with the first symbol.

In accordance with another aspect of the present invention, a system for determining an FFT window location for extracting data in an OFDM signal received over a transmission channel is provided. The OFDM signal includes a plurality of symbols, each having a guard interval, and the system comprises a correlation module to determine a location of maximum correlation in a first symbol of the plurality of symbols, an FFT module to perform an FFT on the OFDM signal based upon an initial FFT window location, and an adjustment module, coupled to the FFT module. The adjustment module determines a plurality of permissible echo location options based upon the initial FFT window location, selects a permissible echo location option from the plurality of permissible echo location options that corresponds most closely to the location of maximum correlation, and adjusts the initial FFT window location based upon the selected permissible echo location option so that the adjusted FFT window location includes substantially all of a useful symbol length of the first symbol while a maximum number of echoes are included within the guard interval of the first symbol.

In accordance with one embodiment, the correlation module determines a location of maximum correlation between a guard interval of the first symbol and a portion of the useful symbol length of the first symbol. In one exemplary implementation, the correlation module calculates over a first window that is the guard interval in length, a plurality of sums, each corresponding to a respective location of the first window as the respective location of the first window is moved along a useful length of the first symbol, of a correlation between time domain samples of the first symbol that are spaced apart from each other by the useful symbol length of the first symbol, for each of the time domain samples of the first symbol that are within the first window; calculates over a second window that is the guard interval in length, a plurality of averages, each corresponding to a respective location of the second window as the respective location of the second window is moved along the useful length of the first symbol, of the plurality of sums that are within the second window; and selects the respective location of the second window having the highest average as the location of maximum correlation.

In accordance with another embodiment, the adjustment module includes a pulse response estimation module, coupled to the FFT module, to perform an estimation of a pulse response of the transmission channel, and determine an initial location and amplitude of each of a plurality of echoes in the first symbol based upon estimation of the pulse response of the transmission channel; and an echo options, analysis, and comparison module, to generate the plurality of permissible echo location options based upon the initial location and amplitude of each of the plurality of echoes in the first symbol, compare a location of each echo in each of the plurality of permissible echo location options to the location of maximum correlation to select the permissible echo location option from the plurality of permissible echo location options that corresponds most closely to the location of maximum correlation, and to adjust the initial FFT window location based upon a location of each echo in the selected permissible echo location option so that the adjusted FFT window location includes substantially all of the useful symbol length of the first symbol while the maximum number of echoes are included within the guard interval of the first symbol.

In one embodiment, the pulse response estimation module may include a pilots extraction and estimated channel module, coupled to the FFT module, to extract pilot signals from an output of the FFT module, and generate a channel estimate of the transmission channel; an Inverse FFT module, coupled to the pilots extraction and estimated channel module, to perform and Inverse FFT on the channel estimate, and generate a channel estimation spectrum that identifies each echo in the channel estimate; and an echoes list generation module, coupled to the Inverse FFT module, to compare the amplitude of each echo in the channel estimate to a threshold, and identify the initial location and amplitude of each of the plurality of echoes in the first symbol based upon each echo in the channel estimate having an amplitude above the threshold.

In another embodiment, the echo options, analysis, and comparison module generates the plurality of permissible echo location options based upon the initial location and amplitude of each respective echo of the plurality of echoes in the first symbol and an alternative permissible location for each respective echo.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A illustrates a measurement of the correlation of the guard interval and the end of the useful part of a symbol and the pulse response of a transmission channel having no meaningful echo energy;

FIG. 2B illustrates a measurement of the correlation of the guard interval and the end of the useful part of a symbol and the pulse response of a transmission channel having meaningful echo energy;

FIG. 5 illustrates a channel estimate spectrum that may be provided by a pulse response estimation module in accordance with the present invention;

FIG. 6 is an exemplary illustration of an echoes energy list that may be provided by the pulse estimation module;

FIG. 7 graphically illustrates an initial echo location option that may be determined by an Echo Options, Analysis, and Comparison module in accordance with the present invention;

FIG. 8 graphical illustrates the manner in which the Echo Options, Analysis, and Comparison module determines permissible echo location options based upon the initial echo location;

DETAILED DESCRIPTION

Figure 1:
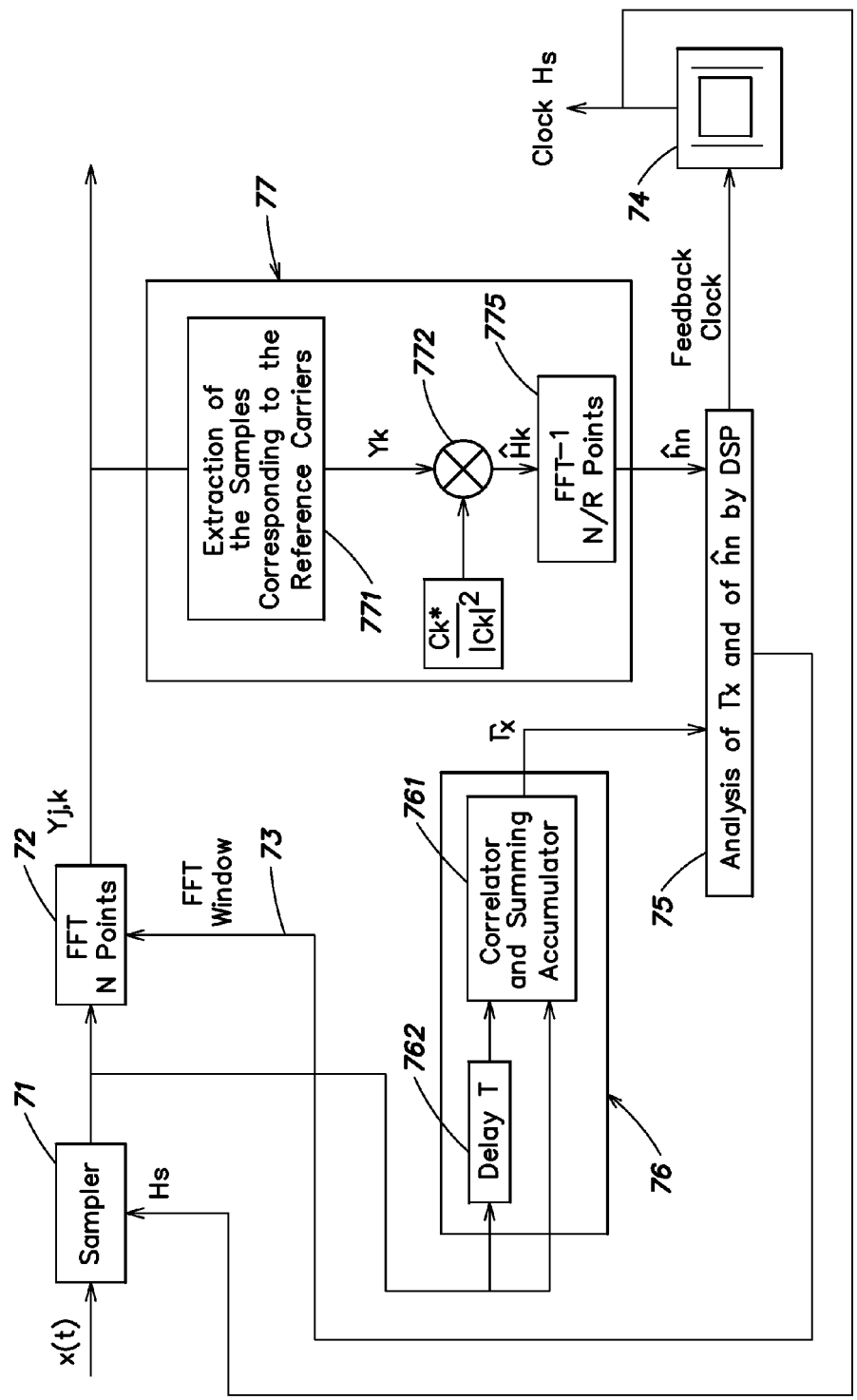
FIG. 1 is a functional block diagram of a known device for synchronizing an FFT window placement according to the prior art.

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As used herein, the term "data" refers to physical signals that indicate or include information. The term "data" includes data existing in any physical form, and includes data that are transitory or are being stored or transmitted. For example, data may exist as electromagnetic or other transmitted signals or as signals stored in electronic, magnetic, or other form.

A "memory" is a physical medium that can store data. Examples of memories include magnetic media such as diskettes, floppy disks, and tape; optical media such Magneto-Optic disks, CDs, and DVDs; and semiconductor media such as semiconductor ROMs, RAMs, etc.

A display device refers to a device that can receive audio and/or video data and provide a representation of that data in a human perceptible form. Examples of display devices include screen display devices such as televisions, computer monitors, PDA or cell phone screens, projection display devices, etc., as well as audio display devices such as radios and other types of audio systems.

Prior to describing embodiments of Applicant's invention in detail, a further discussion of the ambiguity that may be present when pulse response estimation is used to determine FFT window placement is now described with respect to a 2K mode (2048 carriers) DVB-T Standard OFDM signal.

Figure 3A:
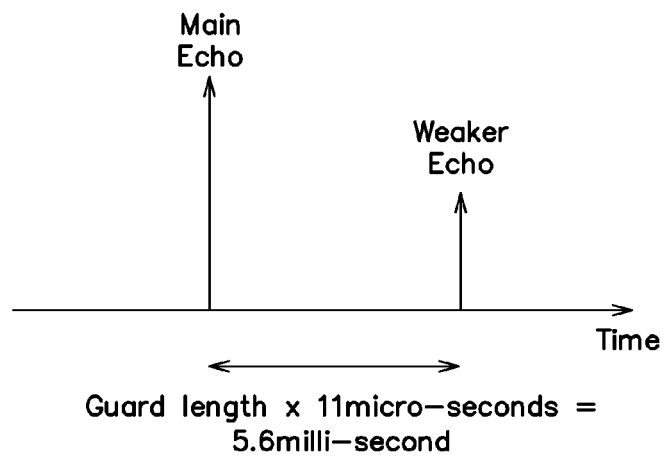
FIGS. 3A, 3B, and 3C illustrate how the results of a known pulse response estimation process can be ambiguous when the length of the guard interval of a symbol is greater than one half the length of the IFFT window over which that pulse response is determined.

In the DVB-T Standard, the ratio of the length (duration) of the guard interval ($\Delta$) relative to the length (duration) of the useful symbol ($T_U$), termed the 'Guard Length Ratio,' may be 1/4, 1/8, 1/16, or 1/32, meaning that the increased symbol length ($T_S$) is 1 part guard interval to 4 parts useful data, 1 part guard interval to 8 parts useful data, etc. The sample time for N=2048 (2 k mode) is approximately 11 micro seconds ($11*10^{-6}$ seconds) per sample and for a Guard Length Ratio of 1/4, this corresponds to a guard interval of 512 samples. Because the Guard Length Ratio is an indication of the quality of the channel, this means that any appreciable echo energy should be confined to this interval, and thus it is possible to receive a first main echo, and another, less strong echo 512 samples or 5.6 milliseconds (512 samples×$11*10^{-6}$ seconds per sample=5.6 milliseconds) away from the main strong echo. This is illustrated in FIG. 3A which depicts a first main echo being received at a first time, and a second and weaker echo being received at a second time 5.6 milliseconds later.

For many DVB-T Standard Systems, and as illustrated in FIG. 3 of the '744 patent, within a given symbol, the location of pilot signals are spaced apart from each other by 11 carriers containing useful data. From one symbol to the next symbol on an adjacent sub-carrier, the location of the pilot signals is shifted (to the right) by three locations, such that the pattern of pilot signals is repeated every fourth symbol. Thus, when analyzed as a group of four or more symbols, the effective pilot sub-carrier to total sub-carrier ratio of the DVB-T Standard OFDM signal is 1 to 3, meaning that the pilot signals occupy 1 out of every 3 frequency spots. If pulse response estimation is used to determine the position of echoes, and the receiver extracts pilot signals every third frequency spectrum bin, then a channel spectrum is obtained with frequency bins 3 times larger than the sample frequency divided by N=2048.

Figure 3B:
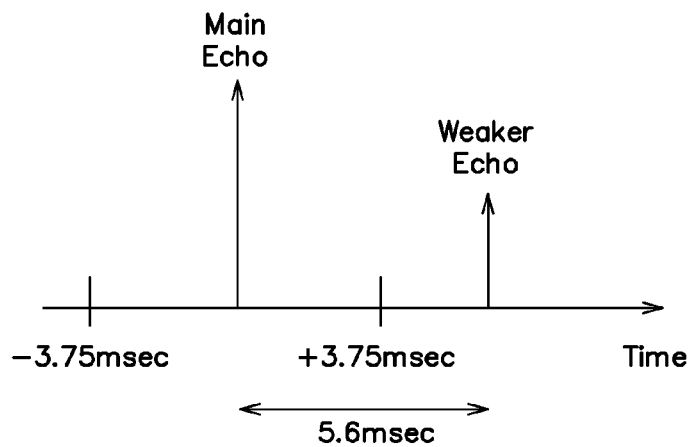
Figure 3C:
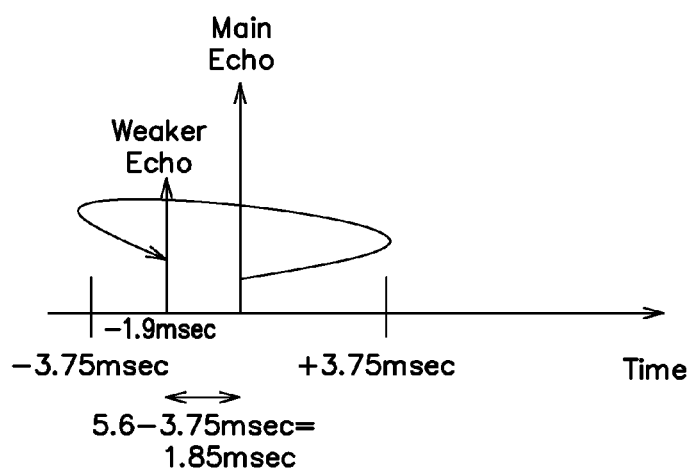

To estimate the channel in the time domain, an IFFT is performed on the channel spectrum. Because the frequency resolution (i.e., the minimal frequency bin) of the channel spectrum is 3 times larger than the sample frequency divided by N=2048, the IFFT can only see up to 1/3 of the time that it took to collect the data, or 7.5 milliseconds ((N/3)*(sample time)=(2048/3)*$11*10^{-6}$=7.5 milliseconds). Thus, as illustrated in FIG. 3B, the viewing limit of the IFFT is +/−3.75 milliseconds, and although the first main echo is located within the viewing limit of the IFFT, the weaker echo is located outside the viewing limit of the IFFT. Because of the cyclic property of both the FFT and the IFFT, after performing the IFFT, the echoes would appear as shown in FIG. 3C within the receiver, and the receiver cannot discern whether the second and weaker echo came 1.9 milliseconds before the main echo or 5.6 milliseconds after the main echo, since both possibilities are permissible for a guard mode (Guard Length Ratio) of 1/4 (i.e., both options are within the 5.6 millisecond guard length interval).

It should be appreciated that the results of pulse response estimation are ambiguous under only certain conditions, and are not ambiguous under others. For example, if in the example above, the effective pilot carrier spacing was one every two sub-carriers rather than one every three sub-carriers, then the frequency resolution of the channel spectrum would be only 2 times larger than the sample frequency divided by N=2048. Accordingly, the IFFT would be capable of seeing up to 1/2 the time that it took to collect the data, or 11.3 milliseconds (i.e., ((N/2)*(sample time)=(2048/2) *$11*10^{-6}$=11.3 milliseconds), and thus, the viewing limit of the IFFT would be +/−5.6 milliseconds. Because all appreciable echo energy should be contained within the guard interval of 5.6 milliseconds, there would be no ambiguity. Similarly, if instead the effective pilot carrier spacing was maintained at one every three sub-carriers, but a 1/8 Guard Length Ratio (1/8 guard mode) were used, then the viewing limit of the IFFT would remain at +/−3.75 milliseconds, but any appreciable echo energy would be confined to a guard interval of 2.8 milliseconds, and there would again be no ambiguity. It should be appreciated from the above that the results of pulse response estimation will be ambiguous whenever the Guard Length Ratio is greater than one half the effective pilot sub-carrier to total sub-carrier ratio; that is, whenever the Guard Length Ratio>(1/2)*(1/the effective rate of reception of pilot signals in the OFDM signal, or alternatively, the effective shift in location of pilot signals between adjacent sub-carriers of the OFDM signal). With respect to OFDM Standard systems, such as DVB-T Standard systems that specify an average effective pilot sub-carrier to total sub-carrier ratio of 3, ambiguity in the pulse response estimation will only be an issue whenever a Guard Length Ratio greater than 1/6 is used (i.e., whenever the 1/4 guard mode is used, as the 1/4 guard mode is the only DVB-T Standard guard mode having a Guard Length Ratio greater than 1/6), which ultimately represents a large class of real world systems.

In accordance with embodiments of the present invention, an FFT window synchronization module is provided that can achieve a fast lock and good reception even when conventional pulse response estimation methods would provide an ambiguous result, that is, whenever the Guard Length Ratio is greater than 1/2 times the effective pilot sub-carrier to total sub-carrier ratio of the OFDM signal. Advantageously, for DVB-T Standard systems, embodiments of the present invention are therefore able to overcome echo ambiguity whenever a Guard Length Ratio of greater than 1/6 is used (i.e., whenever a 1/4 guard mode is used).

Figure 4:
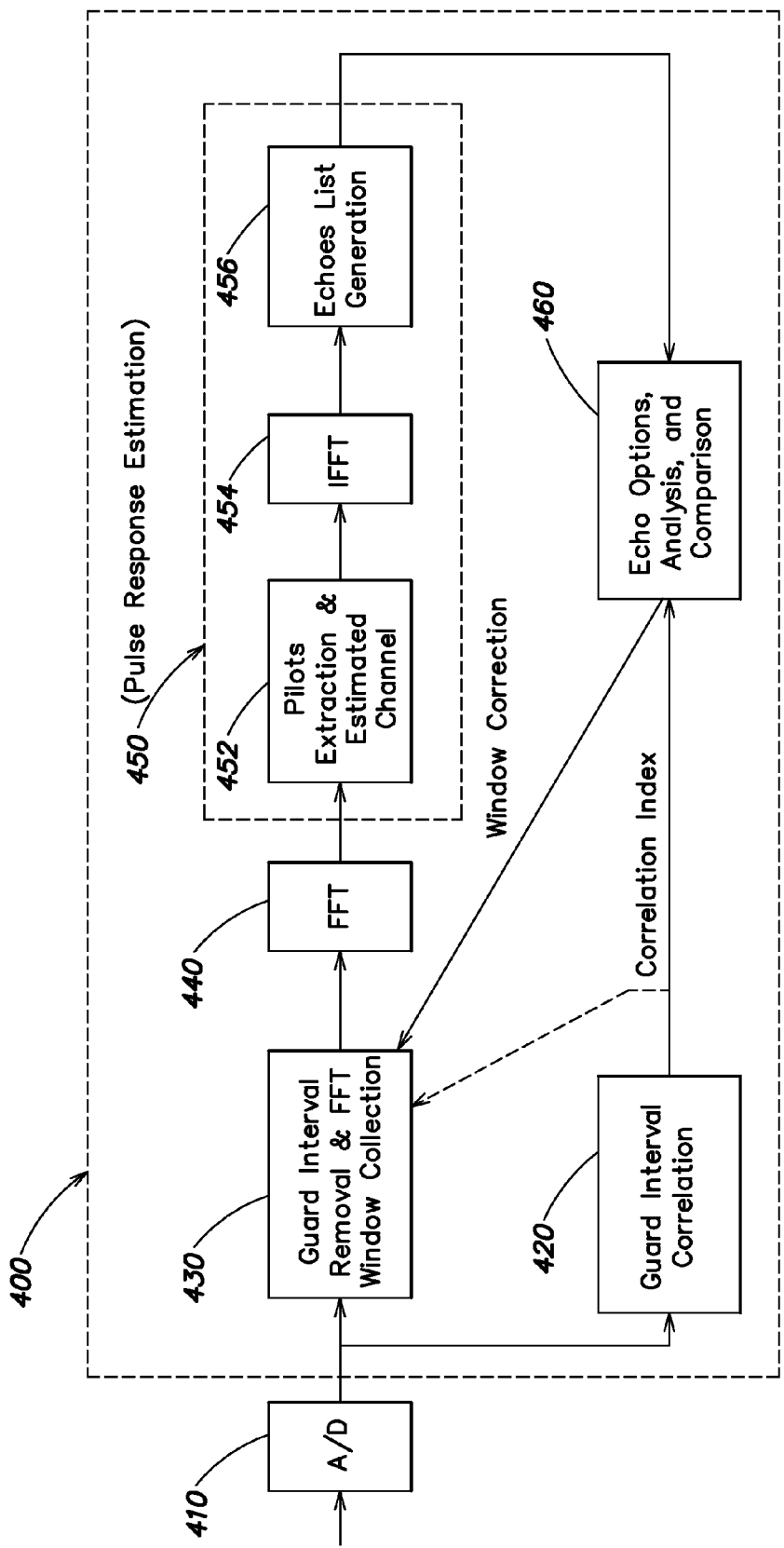
FIG. 4 is a functional block diagram of an FFT window synchronization device in accordance with an embodiment of the present invention.

FIG. 4 is a functional block diagram of an FFT window synchronization module for optimally locating a FFT window on an OFDM signal so that any appreciable echo energy lies within the guard length interval of a symbol in accordance with an embodiment of the invention. As depicted in FIG. 4, the FFT window synchronization module 400 is adapted to receive digitized samples of the OFDM signal from an Analog to Digital (A/D) converter 410, and includes a Guard Interval Correlation module 420, a Guard Interval Removal and FFT Window Collection module 430, an FFT module 440, a Pulse Response Estimation Module 450, and an Echo Options, Analysis, and Comparison Module 460. As described further in detail below, based upon an analysis and comparison of the pulse estimation response and the guard interval correlation, the Echo Options, Analysis, and Comparison Module 460 provides a correction to the current FFT window placement so that the adjusted FFT window location includes substantially all of a useful symbol length of the first symbol while substantially all appreciable echo energy is contained within the guard interval of a symbol.

As illustrated in FIG. 4, a baseband signal is digitized by the A/D converter 410 and the digitized samples are provided to both the Guard Interval Removal and FFT Window Collection module 430 and to the Guard Interval Correlation module 420. The Guard Interval Correlation module 420 is capable of determining a relatively coarse FFT window position by correlating the digitized samples of the received OFDM signal, and thus, is frequently termed a Symbol Time Coarse Acquisition (STCA) module in the art. As noted in the '744 patent, such a Guard Interval Correlation module may be implemented by comparing the sampled signal to a copy of the sampled signal delayed by the useful length ($T_U$) of the sampled signal. However, and as noted in the '744 patent, where there is significant echo energy and/or a high level of interference, such a correlation between the guard interval and the end of the useful part of the sampled signal may not be sufficient to achieve a fine temporal synchronization.

In operation, the Guard Interval Correlation module 420 determines a correlation between samples of the signal taken a symbol length (i.e., useful symbol length $T_U$) apart, and provides a metric, such as a correlation index, identifying the location of maximum correlation. For example, in one embodiment, as a first step of the guard interval correlation process, a sum, termed a 'moving guard length sum,' of the correlation between sample (n) and sample (n+symbol length ($T_U$)) is calculated for each sample that is within a window that is a guard interval in length. This sum is continuously re-calculated as the window over which the sum is calculated (and which is a guard interval in length), is slid or 'moved' (for example, by one sample) along the sampled data.

Where the transmitted signal is received with little or no noise or interference and any echo energy present in the received signal is minimal, the correlation provided by the first step of the guard interval correlation process will have a maximum value where the window over which the correlation is determined corresponds to the guard interval. Such correlation is illustrated in FIG. 2A, which as previously noted, depicts a measurement of the correlation of the guard interval and the end of the useful part of the symbol, and the pulse response h(t), for both a noise-affected idealized signal 11 and for a noiseless idealized signal 12 that are received over a transmission channel with only one path (i.e., having no appreciable echo energy). As can be seen in FIG. 2A, where there is no appreciable echo energy present, the correlation provided by the first step of the guard interval correlation process will resemble a triangle with a defined peak in the region of maximum correlation.

However, and as noted previously, where there is significant echo energy present in the received signal, the correlation provided by the first step of the guard interval correlation process will be less well defined, and will resemble more of a deformed trapezoid, with each echo being reflected by a correlation peak. This is illustrated in FIG. 2B, which as previously noted, depicts a measurement of the correlation, and the pulse response h(t), for both a noise-affected signal 21 and for a noiseless signal 22 that are received over a transmission channel having two paths $24_1$, $24_2$ spaced apart by a length of the guard interval and received with identical power (i.e., having an echo with the same power as the original signal, and a delay equal in length to the guard interval). As can be seen in FIG. 2B, as a result of the first step of the guard interval correlation process, the main signal and each echo are reflected as a correlation peak, and it becomes difficult to discern where to optimally place the FFT window from this correlation alone.

To better identify where to place the FFT window, embodiments of the present invention utilize a second step of correlation, wherein a guard length moving average is performed on the results of the first step. Thus, in the second step of the guard interval correlation process, an average of the moving guard length sums determined in the first step are taken over another window that is a guard interval in length, as that other window is slid or 'moved' (for example, by one sample) along the length of the increased symbol duration (Ts). The second step of the guard interval correlation process effectively determines a guard interval length's region of maximum correlation from the results of the first step, and provides a high variance but unambiguous index for the FFT window position. That is, the second step of the correlation process clearly indicates that the guard interval falls within the identified region, although, the precise location at which it begins and ends generally cannot be identified from this metric alone.

For example, returning to FIG. 2B, and as a result of the first step of the guard interval correlation process, there are two local regions of maximum correlation, one identified at 0, and another identified at 0+Δ. As a result of the second step of the guard interval correlation process, the region of maximum correlation would be between 0 and +Δ inclusive. In one embodiment of the present invention, the region of maximum correlation determined by the Guard Interval Correlation module 420 may be provided as a correlation index (i.e., a data structure) that is provided to the Echo Options, Analysis and Comparison module 460. It should be appreciated that this index may also be provided to the Guard Removal and FFT Window Collection module 430 (indicated in dotted line form in FIG. 4) to enable the Guard Removal and FFT Window Collection module 430 to more quickly or better locate the guard interval for removal.

As depicted in FIG. 4, and in addition to being provided to the Guard Interval Correlation module 420, the digitized samples of the OFDM signal provided by the A/D converter 410 are also provided to the Guard Removal and FFT Window Collection module 430. Using conventional guard interval removal and FFT window collection techniques or utilizing the correlation index, the Guard Removal and FFT Window Collection module 430 locates and removes the guard interval and attempts to place the FFT window on the useful length of the symbol $T_U$. After removal of the guard interval, the FFT module 440 then performs an N-point FFT on the sampled signal, with the FFT result being provided to a Pulse Response Estimation module 450.

In broad overview, the Pulse Response Estimation module 450 extracts reference carriers (i.e., pilot signals) from the FFT result and generates a listing of the location of any appreciable echoes. In one embodiment, the Pulse Response Estimation module includes a Pilot Extraction and Estimated Channel Module 452, an IFFT module 454, and an Echoes List Generation Module 456.

The Pilot Extraction and Estimated Channel module 452 extracts and collects pilot signals (i.e., reference signals transmitted with the data that are used for frame, frequency, and time synchronization, channel estimation, etc.) from the OFDM symbol FFT result and passes these signals through a low pass filter in time to generate a channel estimate (i.e., an estimate of the amplitude and phase shift of the received signal caused by the channel, that is based upon the pilot information). In the IFFT module 454, an IFFT is performed on the channel estimate. The channel estimation spectrum consists of one or more spikes, wherein the location of each spike corresponds to a particular echo's location within the IFFT window, and wherein the amplitude of the spike corresponds to the energy of the echo, as depicted in FIG. 5. It should be appreciated that the IFFT of the channel estimate is equal to the Channel Impulse Response (CIR) in the time domain. The process of determining echo location by use of an Estimated Channel IFFT result is frequently termed 'ECIF' in the art.

The channel estimation spectrum is provided to an Echoes List Generation module 456 which generates a data structure, for example a list, of each echo location and the echo's power, for each echo having an energy (i.e., power) that is above a particular fixed or adaptive threshold. For example, in one embodiment, an adaptive threshold is used in which only echoes having a power that is not less than approximately 21 dB below the most powerful echo in the received signal is used. Thus, for example, as depicted in FIG. 5, there are M distinct echoes, although only the echoes at locations $L_1$, $L_2$, $L_{M-1}$, and $L_M$ have an energy that is above the threshold. An example of an echoes energy list is depicted in FIG. 6, which graphically illustrates a listing of the echo location and power of those echoes from FIG. 5 having a power that is above the threshold.

The echoes list or data structure generated by the Echoes List Generation module 456 is provided as an input to the Echo Options, Analysis, and Comparison module 460. In broad overview, and as illustrated with respect to FIGS. 7-9, the Echo Options, Analysis, and Comparison module 460 creates a plurality of possible echo location options, based upon the provided echoes list, that identifies both the power and location of each possible echo location. These possible echo location options are then compared to the correlation index provided by the Guard Interval Correlation module 420, and the possible echoes location option that is closest to the correlation index is selected as that option corresponding to the true echo locations.

Figure 9:
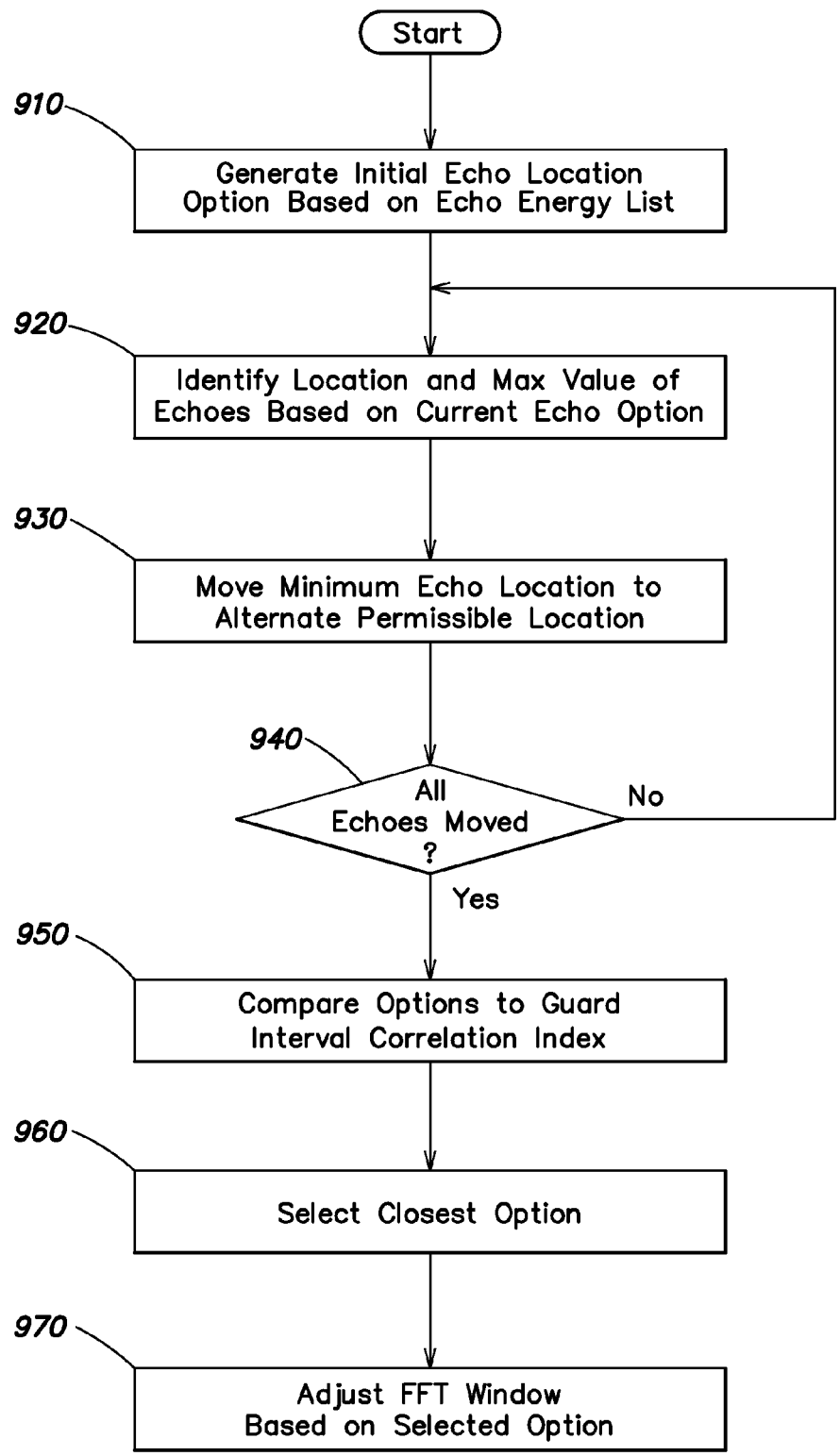
FIG. 9 is a flow chart illustrating steps which may be performed by the Echo Options, Analysis, and Comparison module to synchronize FFT window placement in accordance with the present invention.

In accordance with one embodiment of the present invention, the Echo Options, Analysis, and Comparison module 460 may perform a number of different steps or acts. For example, in a first step, the Echo Options, Analysis, and Comparison module 460 replaces each echo in the echoes energy list with a triangle having have a base that is twice the guard interval in length, and having a height that is equal to the echo's power (i.e. amplitude), as graphically illustrated in FIG. 7. This step of generating an initial echo location option based upon the echoes energy list provided by the Echoes List Generation module 456 is illustrated in FIG. 9 as step 910. In a next step, depicted in FIG. 9 as step 920, the Echo Options, Analysis, and Comparison module 460 performs a moving average over time, typically over an interval that is one to three guard intervals in length, to produce an index or other type of data structure identifying the location and maximum value of each echo. In one embodiment, the interval over which the moving average is determined is one guard interval in length; although it should be appreciated the present invention is not so limited. For example, as illustrated in FIG. 8, Iteration 1, the moving average index would identify a maximum value of $P_1$ at location $Z_1$=L (where L is the length of the guard interval), a maximum value of $P_2$ at location $Z_2$, a maximum value of $P_{M-1}$ at location $Z_{M-1}$, and a maximum value of $P_M$ at location $Z_M$.

The Echo Options, Analysis, and Comparison module 460 then moves (step 930 in FIG. 9) the left most echo (e.g., the echo having the minimal location within the window, in this case, the echo at location $Z_1$) to an alternate permissible location that is spaced apart from the initial location by a distance of the useful symbol length multiplied by the effective pilot sub-carrier to total sub-carrier ratio (i.e., at $T_U/3$ away from its initial location, or at $Z_1$=L+$T_U/3$), and repeats the moving average process. Thus, for example, as illustrated in FIG. 8, Iteration 2, the left-most echo $P_1$ is moved to an alternate permissible position located a distance $T_U/3$ away, and the moving average determination is repeated (step 920). As a result of the second iteration, the moving average index would identify a maximum value of $P_2$ at location $Z_2$, a maximum value of $P_{M-1}$ at location $Z_{M-1}$, a maximum value of $P_M$ at location $Z_M$, and a maximum value of $P_1$ at location L+$T_U/3$. This iterative process of determining the moving average over time and moving the next minimal location valued echo to an alternate permissible echo location located a distance $T_U/3$ away is repeated for each of the M echoes in the echoes energy list. This process of iteratively determining the location and maximum value of each possible echo option and identifying further options is reflected in steps 920, 930, and 940 of FIG. 9.

After determining the maximum value and location of each echo for each of the permissible echo location options, the Echo Options, Analysis, and Comparison module 460 compares each of the permissible options to the current Guard Interval Correlation index, or to the average of a few symbols worth of correlation indices, and selects the option that is the closest to the correlation index. The step of comparing each of the echo location options to the current Guard Interval Correlation index is illustrated as step 950 in FIG. 9, and the step of selecting, as the true location of the echoes, that option which is closest to the Guard Interval correlation index, is illustrated as step 960.

From the selected option (step 960), the Echo Options, Analysis, and Comparison module 460 then determines the true location of each echo based upon the selected option, and provides a window correction to the Guard Removal and FFT Window Collection module 430 that adjusts the FFT window location so that the adjusted FFT window location includes substantially all of the useful data of a symbol while any appreciable echoes are within the guard interval of the symbol, so that reception timing is optimized in terms of the FFT window location placement. This step of adjusting the FFT window location based upon the location of the echoes identified in step 960 is depicted as step 970 in FIG. 9.

In accordance with one embodiment of the present invention, and where the guard interval of a symbol includes a plurality of echoes having an appreciable amount of energy, the location of the FFT window is adjusted such that the FFT window opens after the start of the last appreciable echo contained in the guard interval of the symbol and prior to the end of the first appreciable echo contained in the guard interval of the symbol.

In accordance with one embodiment of the present invention, the FFT window synchronization module 400 may be implemented using a combination of dedicated and general purpose software and hardware to permit the adjustment of the FFT window location provided by the Echo Options, Analysis, and Comparison module 460 to be performed on each symbol of the OFDM signal. Advantageously, this permits embodiments of the present invention to achieve a fast lock and high quality reception even when severe multi-path conditions are present, such as where the transmission echo interval is greater than one half the effective pilot sub-carrier to total sub-carrier ratio of the OFDM signal.

Figure 10:
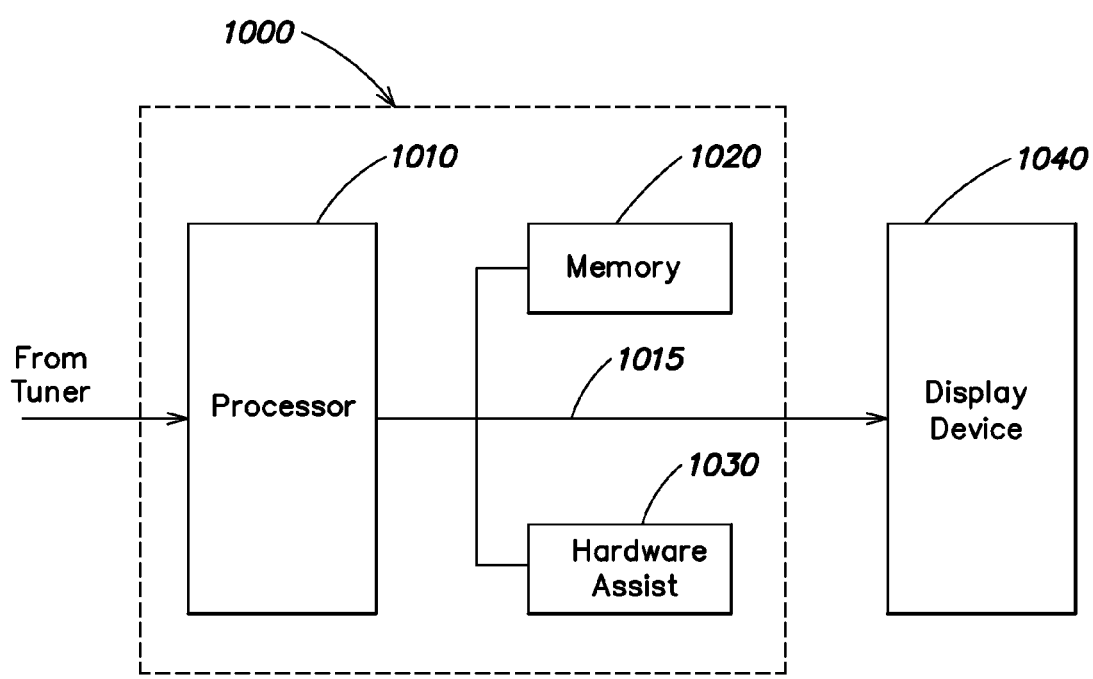
FIG. 10 is a functional block diagram of one exemplary implementation of an FFT window synchronization module in accordance with an embodiment of the present invention.

For example, as depicted in FIG. 10, a functional block diagram of one implementation of an FFT window synchronization module 1000 is shown that includes a processor module 1010, a memory module 1020, and a hardware assist module 1030, coupled together via a bus 1015. In a practical implementation, the window synchronization module 1000 may be part of a larger system or device, such as a Set Top Box (STB), a High Definition (HD) Television, or radio, that receives digitized samples of an OFDM signal (such as DTB-T or T-DAB) received from a tuner section of the device via satellite, from a wireless transmitter, or from a physical transmission media, such as coaxial cable. It should be appreciated that the device or system in which the FFT synchronization module 100 is implemented need not be a stationary device, but could alternatively be a portable device such as a mobile phone, a laptop computer, or a PDA.

The processor 1010 can be some type of a programmable general purpose Digital Signal Processor (DSP), available from companies such as Analog Devices, Motorola, or Texas Instruments, or an application specific DSP designed for a particular application and provided by a company such as Zoran Corporation. The processor 1010 may be the same Digital Signal Processor as that used for extracting the data from the OFDM signal and providing the extracted data to a video and/or audio display device 1040, such as a television display or a radio amplifier. As noted above, the display device 1040 may be either a standalone device (as shown), or may be combined with the synchronization module 1000 into a integrated product.

The memory 1020 generally includes a combination of RAM memory and ROM memory, but may also include other types of memory, such as flash or disk-based memory, etc. In accordance with embodiments of the present invention, the memory may be adapted to store instructions for the processor 1010, as well as additional information, such as the correlation index, the initial echoes energies list, and the various echo locations options as data structures within the memory 1020 for access by the processor 1010 and the hardware assist module 1030.

In one embodiment, the hardware assist module may be a Programmed or Programmable Gate Array (PGA) encoded with instructions to perform the functionality of the Echo Options, Analysis, and comparison Module 460 (FIG. 4) to enable adjustment of the FFT window position to be determined for each symbol. Based upon the adjusted FFW window position, the processor 1010 may provide digital video and/or audio data to the display device 1040 for display to a user. It should be appreciated that for legacy systems still utilizing analog video and/or audio data, the data could be transformed into the appropriate analog format using one or more digital to analog converters prior to being provided to the display device 1040.

It should be appreciated that although certain embodiments of the present invention are capable of adjusting the FFT window position for each received symbol, the present invention is not so limited. In this regard, the adjustment of the FFT window position could be determined every second or third received symbol, appreciating that changing channel conditions (due, for example to the movement of the receiver, the transmitter, or both) may affect the quality of reception. Alternatively still, adjustment of the FFT window position could be performed once every several blocks of the OFDM signal.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method of determining an FFT window location for reception of an OFDM signal received over a transmission channel, the OFDM signal including a plurality of symbols each having a guard interval, the method comprising acts of:
   a) determining, according to a first process, a location of maximum correlation in a first symbol of the plurality of symbols;
   b) determining an initial location of the FFT window;
   c) determining a plurality of permissible echo location options based upon the initial location of the FFT window and a second process, different than the first process;
   d) selecting a permissible echo location option from the plurality of permissible echo location options that corresponds most closely to the location of maximum correlation; and
   e) adjusting the initial location of the FFT window so that the adjusted FFT window location includes substantially all of a useful symbol length of the first symbol while a maximum number of echoes are included within the guard interval of the first symbol;
   wherein each of the plurality of symbols has a useful symbol length, and wherein a ratio of a length of the guard interval relative to a useful symbol length of each of the plurality of symbols is greater than one half an effective pilot sub-carrier to total sub-carrier ratio of the OFDM signal.

2. The method of claim 1, wherein the act (a) includes an act of:
   determining, according to the first process, the location of maximum correlation in the first symbol based upon a correlation between a first plurality of samples of the first symbol and a corresponding second plurality of samples of the first symbol that are spaced apart from the first plurality of samples of the first symbol by the useful symbol length of the first symbol.

3. The method of claim 1, wherein the initial location of the FFT window is based upon the location of maximum correlation determined in act (a).

4. The method of claim 1, wherein the second process determines the plurality of permissible echo location options based upon the initial location of the FFT window and a pulse response estimate of the transmission channel.

5. The method of claim 1, wherein prior to the act of determining the initial location of the FFT window, the initial location of the FFT window was not synchronized with the first symbol.

6. A system for determining an FFT window location for extracting data in an OFDM signal received over a transmission channel, the OFDM signal including a plurality of symbols each having a guard interval, the system comprising:
   a correlation module to determine a location of maximum correlation in a first symbol of the plurality of symbols;

an FFT module to perform an FFT on the OFDM signal based upon an initial FFT window location; and an adjustment module, coupled to the FFT module, to determine a plurality of permissible echo location options based upon the initial FFT window location, select a permissible echo location option from the plurality of permissible echo location options that corresponds most closely to the location of maximum correlation, and adjust the initial FFT window location based upon the selected permissible echo location option so that the adjusted FFT window location includes substantially all of a useful symbol length of the first symbol while a maximum number of echoes are included within the guard interval of the first symbol;

wherein the correlation module and FFT module are implemented in a digital signal processor; and wherein each of the plurality of symbols has a useful symbol length, and wherein a ratio of a length of the guard interval relative to a useful symbol length of each of the plurality of symbols is greater than one half an effective pilot sub-carrier to total sub-carrier ratio of the OFDM signal.

7. The system of claim 6, wherein the correlation module determines a location of maximum correlation between a guard interval of the first symbol and a portion of the useful symbol length of the first symbol.

\* \* \* \* \*